United States Patent [19]

Hauk

[11] Patent Number: 4,793,855
[45] Date of Patent: Dec. 27, 1988

[54] PROCESS FOR THE GASIFICATION OF SEWAGE SLUDGE

[76] Inventor: Rolf Hauk, Friedrichstr. 45, D-4000 Düsseldorf 1, Fed. Rep. of Germany

[21] Appl. No.: 9,184

[22] Filed: Jan. 30, 1987

[30] Foreign Application Priority Data

Jan. 30, 1986 [DE] Fed. Rep. of Germany ....... 3603054

[51] Int. Cl.$^4$ ............................................. C21B 13/00
[52] U.S. Cl. ........................................ 75/26; 75/38; 75/40; 75/43; 48/197 A
[58] Field of Search ............................ 75/43, 40, 38, 26; 48/197 A

[56] References Cited

U.S. PATENT DOCUMENTS

| 4,225,457 | 9/1980 | Schulz | 48/197 A |
| 4,588,437 | 5/1986 | Kepplinger | 75/43 |

FOREIGN PATENT DOCUMENTS 1920 1/1984 Japan ................................. 48/197 A Primary Examiner—Melvyn J. Andrews

[57] ABSTRACT

A process for the gasification of sewage sludge or other carbon-containing waste materials in a gasifier (1) is described. A solid fuel and oxygen-containing gas are also fed into said gasifier. The residues formed during gasification collect at the bottom of the gasifier in the form of molten slag. Gasification takes place in a fluidized bed (9) formed above the slag bath and constituted by the dried sewage sludge or waste materials, the solid fuel, the oxygen-containing gas and the gasification gas. The gas produced in the gasifier can be used for power generation or as a reducing gas for iron ore. Sponge iron can simultaneously be melted in the gasifier and reduced to pig iron.

9 Claims, 1 Drawing Sheet

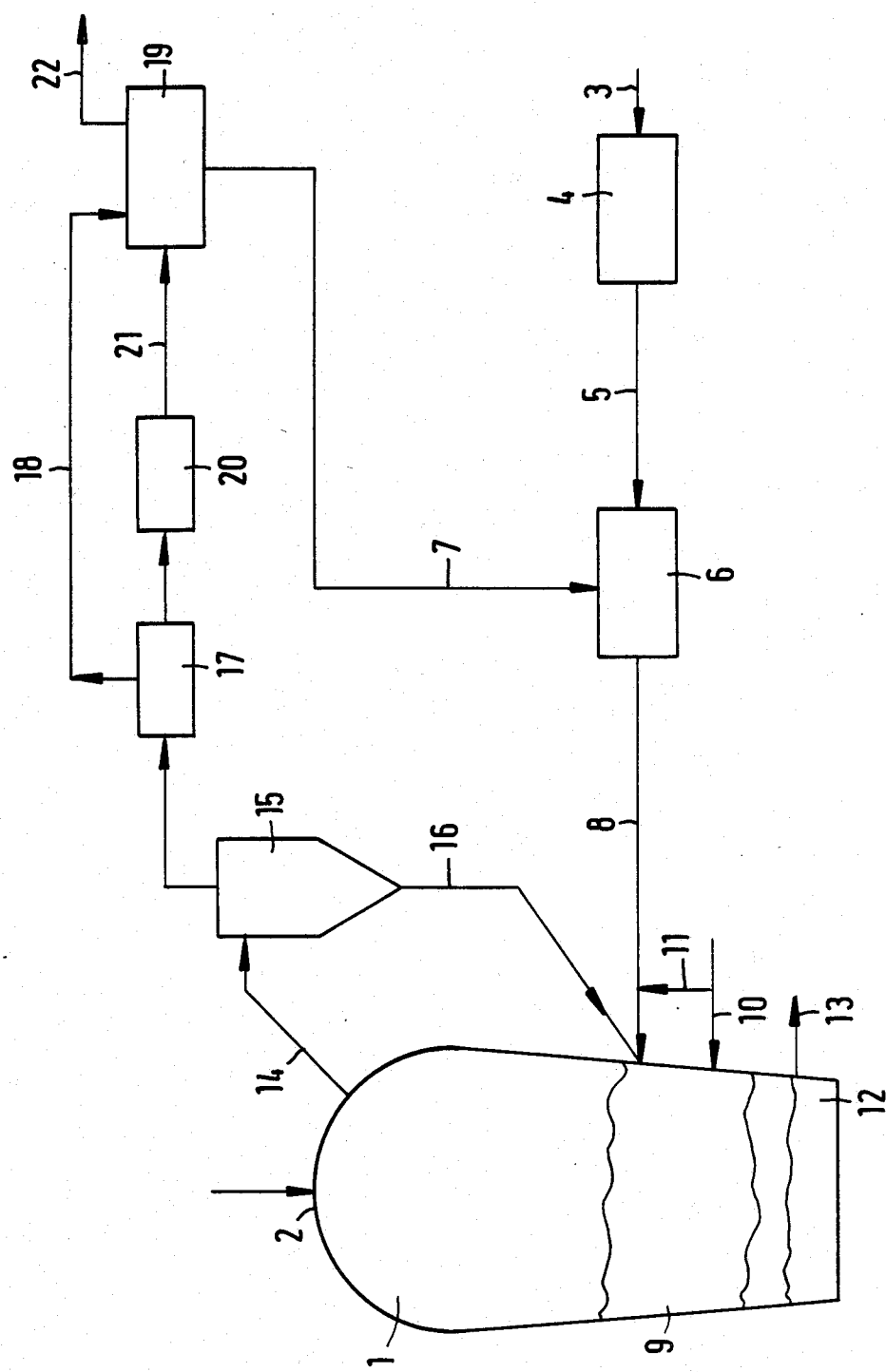

PROCESS FOR THE GASIFICATION OF SEWAGE SLUDGE

The invention relates to a process for the gasification of sewage sludge or other carbon-containing waste materials according to the preamble of claim 1.

The hitherto used measures for eliminating or using sewage sludge have comprised the dumping or burning thereof after drying, or the use thereof as a fertilizer in agriculture. The dumping of sewage sludge requires a large amount of space and involves additional high costs. Combustion is problematical in that in the case of incomplete combustion dioxins can form and the undesired heavy metals in the ash can partly be leached out with water. There are considerable objections to the use sewage sludge as a fertilizer due to the heavy metals contained therein and it is largely no longer allowed.

Another use of sewage sludge is described in German Pat. No. 29 23 726, according to which the dried sewage sludge is used as a reducing agent for reducing iron oxides. The dried sewage sludge and dry iron oxide are mixed and optionally pelletized and then heated over a long period, there being a partial reduction of the iron oxide to sponge iron. However, this process is unsuitable for economic industrial use. In addition, it fails to solve the problem of the disposal of heavy metals.

DE-OS No. 32 03 435 describes a process for producing gas and extracting metals in a molten bath reactor, particularly an iron bath reactor, in which on the one hand gas is produced in that a carbon-containing fuel and oxygen are introduced into a meltable bath material, particularly an iron bath of the melting bath reactor and on the other hand metal is extracted in that the metal carrier is fed into the molten bath. The gas produced is largely coal gas comprising CO and $H_2$. The fuel introduced into the molten bath material has a small proportion of the metal to be extracted, which dissolves in the melt and is enriched therein and can be drawn off after reaching a given concentration. The fuel can in part consist of products with moderate proportions of combustible substance, such as sewage sludge and industrial waste and on the one hand it is possible to extract therefrom metals, apart from heat, and on the other hand heavy metals can be separated in a manner not prejudicial to the environment, so that pollution is correspondingly reduced. However, apart from heat production, the aim of this process is mainly the production of metal and not the elimination of sewage sludge. The sewage sludge proportion in the total fuel is necessarily very limited, because as a result of endothermic reactions it greatly cools the molten bath and in addition the volatile components contained therein leads to a considerable and undesirable bath movement.

The problem of the present invention is to improve the known process for the gasification of sewage sludge or other carbon-containing waste materials in a gasifier, in that additionally a solid fuel and oxygen-containing gas are fed in, a slag bath being formed in the bottom region of the gasifier, so that a complete utilization of the combustion energy contained in the sewage sludge and waste materials and an elimination of the heavy metals so that disposal is problem-free, the sewage sludge or waste material proportion in the total fuel can be increased in such a way that an economically suitable sewage sludge and waste material elimination is possible.

This problem is solved according to the invention by the feature of the characterising part of claim 1. Advantageous further developments of the inventive process can be gathered from the subclaims.

The invention is characterized in that the gasification is performed in a fluidized bed above the slag bath and which comprises the sewage sludge or waste materials, the solid fuel and the oxygen-containing gas. The sewage sludge is completely reacted at high temperature and in the case of an adequate residence time, so that there is no longer any risk of dioxins or other environmentally prejudicial gases forming. The heavy metals in the sludge are combined into the slag.

The process is preferably combined with the production of pig iron, additional sponge iron being melted in the gasifier and reduced to pig iron. The gas produced in the gasifier is advantageously used for reducing iron ore into sponge iron, which is subsequently melted in the gasifier.

It has been found that sewage sludge with a residual moisture of 10% can be admixed in a proportion of 15% with the fuel, without impairing the reducing and melting process. When using low volatility coal as an additional fuel, theoretical results have shown that the sewage sludge proportion can be increased to 40%.

The invention is described in greater detail hereinafter relative to an embodiment illustrated in the drawing, which diagrammatically shows a sewage sludge gasification plant.

Coal with a grain size range of 0 to 50 mm, is fed together with fluxes through an inlet 2 into the top of a fluidized bed gasifier 1. Petroleum coke could be used instead of coal. Using a line 3, sewage sludge is fed to a centrifuge 4, where it is partly dewatered. The still pumpable sewage sludge is then passed through a line 5 to a dryer 6, to which steam is supplied via a line 7 and with the aid thereof the sewage sludge is dried to a residual moisture content of 10%. The thus prepared sewage sludge is then conveyed pneumatically via a line 8 to the fluidized bed gasifier 1 and is fed into the latter in the middle to upper region of a fluidized bed 9. A partial flow of the oxygen-containing gas required for gasification purposes in the fluidized bed is fed via a line 10 into the lower area of fluidized bed 9, where it reacts to $CO_2$ or CO and then rises therein, so that the fluidized bed is maintained. A further partial flow of oxygen-containing gas passes via a line 11 into line 8 and is fed with the sewage sludge into the fluidized bed gasifier 1. The heat forming during the gasification of the coal and sewage sludge produces such a high temperature in fluidized bed 9, that no dioxins can form due to incomplete combustion of the sewage sludge. The temperature is also sufficiently high to permit the formation in the bottom of the fluidized bed gasifier of a molten slag bath 12 formed during the gasification of the coal and the sewage sludge. The slag, which also contains the heavy metals in the sewage sludge is tapped at appropriate time intervals by means of a line 13. It is also possible to feed the sewage sludge together with the coal into the fluidized bed gasifier 1 through the inlet 2 at the top thereof. The oxygen-containing gas can also be heated prior to the supply via lines 10 and 11 into fluidized bed gasifier 1, so that the sewage sludge proportion in the total fuel can be increased. If additional sponge iron is to be melted in the fluidized bed gasifier 1, then it is fed in over the fluidized bed 9, preferably in the top region of the gasifier, is then melted and reduced in bed 9 and collects as a molten iron bath at the bottom of gasifier 1.

Due to its lower specific weight, the molten slag then collects on the iron bath.

As a result of gasification, CO and optionally $H_2$-containing gas is produced in fluidized bed 9 and is passed via a line 14 from gasifier 1 to a cyclone 15. In the latter coarse entrained coal and sponge iron particles are removed from the gas, the separated solid particles being returned via a line 16 to the fluidized bed gasifier 1. The gas from which the coarse dust has been removed then passes to a waste heat system 17, in which the thermal energy contained in the gas is used for producing high pressure steam, which is passed via a line 18 to a power station 19. The gas cooled in this way is fed into a dust filter 20, where the very fine solid particles are separated and also gaseous contaminants, such as sulphur or chlorine are absorbed. Finally the gas is passed via a line 21 to power station 19, where it is burned. From the combustion energy and the high pressure steam energy from line 18 low pressure steam, which is fed via line 7 to dryer 6, and electric power which is removed by a line 22 are produced.

If the plant is simultaneously used for the production of pig iron, then the gas produced in the fluidized bed gasifier can also be used as a reducing gas for the direct reduction of iron ore to sponge iron. The sponge iron formed is then fed into the fluidized bed gasifier, melted and reduced to pig iron.

I claim:

1. Process for the gasification of sewage sludge or other carbon-containing waste materials in a gasifier having bottom, a middle and upper areas, comprising steps of: feeding sewage sludge or other carbon-containing waste materials, a solid fuel and oxygen-containing gas into a gasifier, producing gasification gas in the gasifier and forming a slag bath adjacent to the bottom of said gasifier, forming a fluidized bed above the slag bath, said fluidized bed being formed from the sewage sludge or other carbon-containing waste materials, the solid fuel, the oxygen-containing gas and the gasification gas.

2. Process according to claim 1, wherein said fluidized bed includes middle and upper areas and said sewage sludge or waste materials are fed to the gasifier adjacent to the middle and upper areas of the fluidized bed.

3. Process according to claim 1, further including feeding the sewage sludge or waste materials, together with the solid fuel into the gasifier from above the fluidized bed upper area into the fluidized bed.

4. Process according to one of the claims 1 to 3 wherein said solid fuel comprises coal.

5. Process according to one of the claims 1 to 3 wherein said solid fuel comprises petroleum coke.

6. Process according to one of the claims 1 to 3 including heating the oxygen-containing gas before said oxygen-containing gas is fed into said gasifier.

7. Process according to one of the claims 1 to 3, wherein the gasification gas produced in the gasifier is capable of producing heat and the process further includes a step of using at least part of the heat produced by the gasification gas produced in the gasifier for drying the sewage sludge prior to supplying said sewage sludge to the fluidized bed.

8. Process according to one of the claims 1 to 3 further including melting additional sponge iron in the gasifier and reducing it to pig iron.

9. Process according to claim 8, further including using at least part of any gas produced in the gasifier for reducing iron ore to sponge iron.

* * * * *